(12) United States Patent
Kim et al.

(10) Patent No.: US 7,051,993 B2
(45) Date of Patent: May 30, 2006

(54) SOLENOID OPERATED VALVE AND METHOD OF MAKING SAME

(75) Inventors: Tae-Kyung Kim, Sterling Heights, MI (US); Kenneth J. Parker, Lake Orion, MI (US); Charles Chang, Rochester Hills, MI (US); Nathan W. Kryglowski, Clawson, MI (US)

(73) Assignee: Eaton Corporation, Cleveland, OH (US)

( * ) Notice: Subject to any disclaimer, the term of this patent is extended or adjusted under 35 U.S.C. 154(b) by 121 days.

(21) Appl. No.: 10/797,488

(22) Filed: Mar. 10, 2004

(65) Prior Publication Data
US 2005/0199846 A1 Sep. 15, 2005

(51) Int. Cl.
*F16K 31/02* (2006.01)
(52) U.S. Cl. .................................. 251/129.15
(58) Field of Classification Search ........... 251/129.15, 251/129.01
See application file for complete search history.

(56) References Cited

U.S. PATENT DOCUMENTS

| 4,678,006 | A |   | 7/1987 | Northman |
| 4,756,331 | A |   | 7/1988 | Stegmaier |
| 4,947,893 | A | * | 8/1990 | Miller et al. ............ 251/129.15 |
| 5,135,027 | A |   | 8/1992 | Miki et al. |
| 5,513,673 | A | * | 5/1996 | Slavin et al. .......... 251/129.18 |
| 5,513,832 | A | * | 5/1996 | Becker et al. ......... 251/129.15 |
| 5,558,311 | A | * | 9/1996 | Connolly et al. ...... 251/129.15 |
| 6,242,840 | B1 | * | 6/2001 | Denk et al. ................. 310/254 |
| 6,386,220 | B1 | * | 5/2002 | Koenings ................ 251/129.08 |

FOREIGN PATENT DOCUMENTS

DE  25 04 521 A1   8/1976
JP  2003-142313    5/2003

OTHER PUBLICATIONS

European Search report dated May 18, 2005, Application No. 05005250.5-2423.

* cited by examiner

*Primary Examiner*—John Bastianelli
(74) *Attorney, Agent, or Firm*—Anna M. Shih

(57) ABSTRACT

A solenoid operated valve has first flux collector, bobbin with coil and an armature assembled onto a valve body with a tubular housing received over the body and first portions of the housing, in the form of tabs, deformed over the bobbin flange to retain the assembly. A second flux collector with adjustable pole price is then assembled adjacent the bobbin and retained in place by deformation of second portions of the housing. The pole piece is accessible exteriorly for adjustment through the end of the housing.

13 Claims, 2 Drawing Sheets

US 7,051,993 B2

SOLENOID OPERATED VALVE AND METHOD OF MAKING SAME

BACKGROUND OF THE INVENTION

The present invention relates to electrically operated valves and particularly to valves of the type operated by a solenoid actuator and, more particularly, to solenoid operated valves intended for energization by a relatively low voltage power supply as, for example, the type found on-board a motor vehicle typically having a direct current voltage of about 12 to 14 volts.

Solenoid operated valves have found widespread usage in on-board vehicle applications for controlling flow of fuel vapor from a storage device to the combustion chamber inlet of an engine and for control of hydraulic pressure/flow in automatic shifting power transmissions on the vehicle.

Heretofore, it has been known to construct such a solenoid operated valve with the electrical coil and pole pieces secured to the valve body by disposing a housing thereover and deforming portions of the housing to retain the assembly. However, this arrangement has resulted in difficulty in accurately locating and tightly securing the interior components of the valve without the need for internal retainers prior to final assembly with the housing.

Thus, where internal retainers or fasteners have been needed to locate and secure the internal components, additional prohibitive costs have been experienced for high volume mass production, as is required for passenger car and light truck applications.

Thus, it has long been desired to provide a way or means of assembling a solenoid operated valve intended for energization by an on-board vehicle power supply operating at relatively low voltage in a manner which insures proper location and retention of the valve components and enables the final assembly to be achieved by disposing the housing for the valve over the components and deforming portions of the housing for retaining the assembly.

BRIEF SUMMARY OF THE INVENTION

The present invention provides a relatively simple, yet effect and low cost, technique for assembling a solenoid operated valve wherein the internal components of the valve including the lower pole piece, armature and bobbin with coil are assembled onto the body and a housing received thereover with first portions thereof deformed to retain the bobbin in place. The remaining pole piece or flux collector is received in the housing adjacent the end of the bobbin and appropriate adjustments made, with the remaining flux collector retained in place and secured by deformation of other portions of the housing.

DETAILED DESCRIPTION OF THE INVENTION

Figure 1:
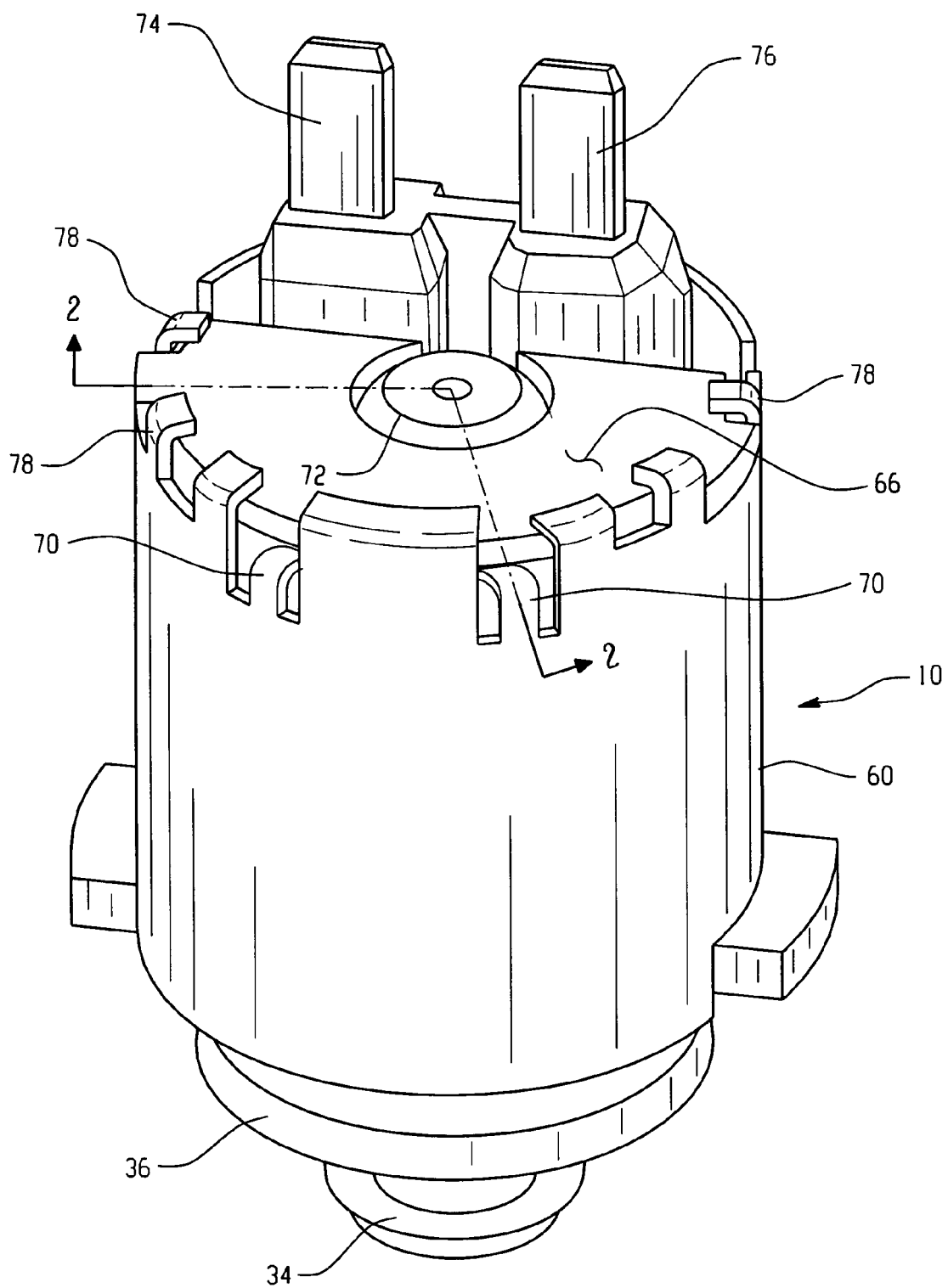
FIG. 1 is a perspective view of the assembled valve of the present invention illustrating the deformed portions of the housing for retaining the bobbin and the separate deformed portions of the housing operable for retaining the flux collector; and, FIG. 2 is a section view taken along section indicating lines 2—2 of FIG. 1.
Figure 2:
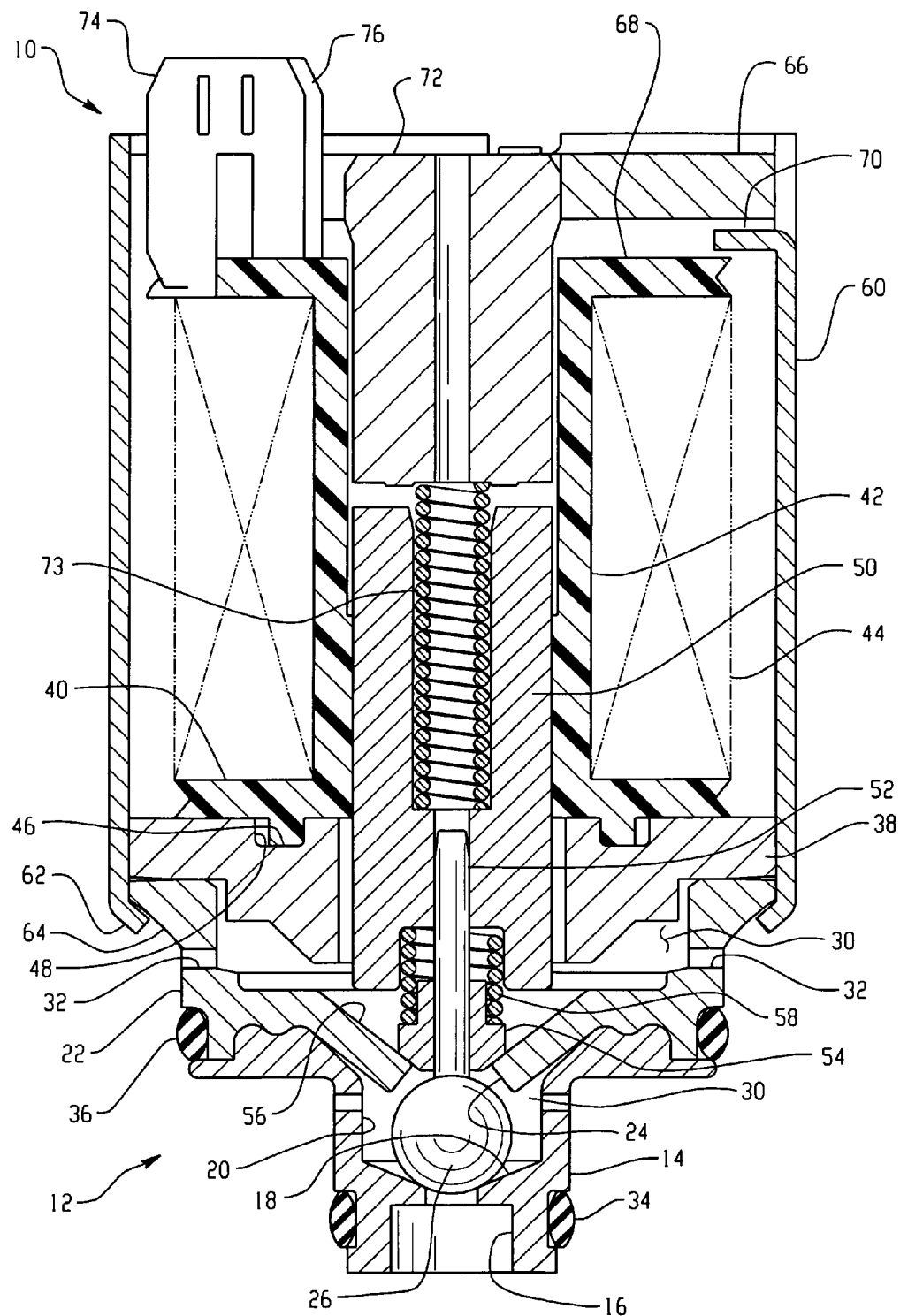

Referring to FIGS. 1 and 2, the valve assembly of the present invention is indicated generally at 10 and includes a valve body indicated generally at 12 having a lower portion 14 having an inlet 16 which communicates with a valve seat 18 and valving chamber wall 20.

A second or upper body portion 22 is disposed on lower body portion 14 closing chamber 30 and has a valve seat 24 formed thereon which is oppositely directed from valve seat 18. A moveable valve obturator preferably in the form of the ball 26 is disposed for movement between valve seats 24 and 18. The chamber formed between valve seat 18 and valve seat 24 is ported through passage 28 formed in the lower body 14 to provide a pressure control signal outlet from chamber 30. The pressure in chamber 30 is controlled by the position of the ball 26 between the valve seats 18, 24.

The upper body has at least one passage 32 formed therein for providing fluid communication exteriorly of the body, for the fluid flowing over valve seat 24 from the control pressure chamber 30 to the atmosphere or a sump.

It will be understood that the valve body 12 is intended to be inserted into an access opening or cavity in a fluid operated structure (not shown) with the inlet port 16 isolated from the control pressure signal port 28, which is in turn isolated from the exhaust port 32 by resilient seal rings 34, 36 disposed in grooves about the outer periphery of the body 12.

The upper body 22 has a first or lower annular flux collector 38 received in contact thereon with a lower annular flange 40 of a bobbin 42 received concentrically on flux collector 38 in concentric arrangement therewith and having a coil 44 of electrically conductive material wound thereon. If desired, an annular locating rib 46 may be provided on the axial face of the bobbin flange 40 and received in a groove 48 formed in the flux collector 38 for positioning and locating the bobbin with respect thereto.

The upper body 22 has a first or lower annular flux collector 38 received in contact thereon with a lower annular flange 40 of a bobbin 42 received concentrically on flux collector 38 in concentric arrangement therewith and having a coil 44 of electrically conductive material wound thereon. If desired, an annular locating rib may be provided on the axial face of the bobbin flange 40 and received in a groove 48 formed in the flux collector for positioning and locating the bobbin with respect thereto.

A moveable armature 50 is slidably received in the bobbin and has a centrally disposed pin or rod 52 attached thereto as, for example by press fitting engagement. Rod 52 extends axially downwardly therefrom through a guide bushing or bearing 54 which registers thereagainst and is positioned by contacting the tapered surface 56 formed in the upper body 22 for locating and centering the rod with respect to the valve seat 24. The bushing 54 is biased downwardly into contact with surface 56 by a coil spring 58 having its lower end registered against bushing 54 and its upper end disposed in and contacting a recess provided in the lower surface of armature 50.

A tubular housing or can 60 is received over the bobbin and coil 44. Housing 60 preferably has a radially inward extending annular flange 62 formed on the lower end thereof which contacts tapered surface 64 formed on the upper housing member 22 for locating the can axially on the valve body.

The bobbin 42 with coil 44 and flux collector 38 are retained on the body by deforming first portions of the housing 60 inwardly over the upper flange 68 of the bobbin. In the presently preferred practice, the deformed portions comprise a plurality of circumferentially spaced tabs 70 formed about the periphery of housing 60.

A second annular flux collector 66 is received in the housing and has a pole piece 72 provided thereon which extends into the central region of the bobbin to form an air gap with the upper end of armature 50. The pole piece 72 is preferably threadedly engaged in the flux collector 66 for providing adjustment of the air gap from the exterior of the housing.

A spring 73 is provided between the armature 50 and the lower end of pole piece 72 for biasing the armature in a downward position to cause the rod 52 to urge ball valve 26 into contact with lower valve seat 18.

It will be understood that a pair of electrical terminals 74, 76 extend upwardly from the upper flange 68 of the bobbin through an access opening 76 provided in the flux collector to facilitate exterior electrical connection to the coil 44. The upper flux collector and pole piece 72 are retained in position in axial registration against the tab 70 by deforming second portions of the housing preferably in the form of tabs 78 over the upper surface of the flux collector 66.

The present invention thus provides a unique and novel way of assembling a solenoid operated valve in a manner which permits the coil bobbin and armature to be assembled onto the valve body by simple metal deformation of first portion of a housing placed thereover; and, subsequently the flux collector and adjustable pole piece may be assembled thereover, and the assembly completed by simple deformation of other portions of the housing. The pole piece is accessible through the end of the housing to facilitate adjustment of the air gap. The present invention thus provides a low cost and simple way to assemble and calibrate a solenoid operated valve without the need for separate fasteners to retain the components in their assembled condition and proper orientation.

Although the invention has hereinabove been described with respect to the illustrated embodiments, it will be understood that the invention is capable of modification and variation and is limited only by the following claims.

What is claimed is:

1. A method of making a solenoid operated valve comprising:
   (a) providing a valve body with a first flux collector thereon;
   (b) disposing a coil and bobbin with a proximal end adjacent said first flux collector;
   (c) disposing a housing over the bobbin and deforming first portions of the housing over the bobbin and retaining the bobbin and housing on the body; and,
   (d) disposing a second flux collector in said housing adjacent distal end of said bobbin and deforming second portions of the housing and retaining said second flux collector in said housing.

2. The method defined in claim 1, wherein said step of deforming first portions of the housing includes forming a plurality of tabs and bending the tabs over a distal end of the bobbin.

3. The method defined in claim 1, wherein said step of disposing a housing includes forming a cylindrical shell and forming an inward flange on a proximal end thereof.

4. The method defined in claim 1, wherein said step of disposing a housing includes forming a cylindrical shell and forming a plurality of tabs circumferentially spaced about the shell and said step of deforming first portions includes bending said tabs.

5. The method defined in claim 1, wherein said step of deforming second portions includes forming a plurality of tabs on the distal end of the housing and bending said tabs over said second flux collector.

6. A solenoid operated valve comprising:
   (a) a valve body with a first flux collector with a coil bobbin having one end disposed proximate said first flux collector;
   (b) a housing disposed with said body and having a first portion thereof deformed for retaining said bobbin on said body; and,
   (c) a second flux collector disposed adjacent an end of said bobbin distal said one end and over the first portion, wherein said housing has at least a second portion thereof deformed for retaining said second flux collector.

7. The valve defined in claim 6, wherein said first portions of said housing includes a plurality of tabs formed integrally therewith.

8. The valve defined in claim 7, wherein said tabs are bent over a flange of the bobbin.

9. The valve defined in claim 6, wherein said second portions of said housing includes a plurality of tabs formed integrally therewith.

10. The valve defined in claim 9, wherein said tabs are bent over said second flux collector.

11. The valve defined in claim 6, wherein said housing has a generally cylindrical tubular configuration.

12. The valve defined in claim 11, wherein said first portion of said housing has inwardly extending surfaces engaging said body.

13. The valve defined in claim 6, wherein said housing comprises a generally cylindrical shell with inwardly extending surfaces at one end thereof in engagement with said body.

* * * * *